United States Patent [19]

Riggs

[11] Patent Number: 4,856,200
[45] Date of Patent: Aug. 15, 1989

[54] TRAILER HITCH ALIGNMENT DEVICE

[76] Inventor: Eugene W. Riggs, 12940 Wilson Rd., Coopersville, Mich. 49404

[21] Appl. No.: 210,861

[22] Filed: Jun. 24, 1988

[51] Int. Cl.$^4$ ............................................. G01C 5/00
[52] U.S. Cl. ..................................................... 33/264
[58] Field of Search ..................... 33/264; 280/477; 116/28 R

[56] References Cited

U.S. PATENT DOCUMENTS

| | | | |
|---|---|---|---|
| 3,159,917 | 12/1964 | Whitehead | 33/264 |
| 3,818,599 | 6/1974 | Tague | 33/264 |
| 3,889,384 | 6/1975 | White | 33/264 |
| 3,901,536 | 8/1975 | Black | 280/477 |
| 3,918,746 | 11/1975 | Lehtisaari | 280/477 |
| 4,169,610 | 10/1979 | Paufler | 280/477 |
| 4,192,526 | 3/1980 | Myers | 280/477 |
| 4,285,138 | 8/1981 | Berry | 33/26 X |
| 4,541,183 | 9/1985 | McConnell | 33/264 |
| 4,583,481 | 4/1986 | Garrison | 116/28 |
| 4,621,432 | 11/1986 | Law | 33/264 |
| 4,627,634 | 12/1986 | Coleman | 280/477 |
| 4,666,176 | 5/1987 | Sand | 280/477 |

Primary Examiner—Harry N. Haroian
Attorney, Agent, or Firm—Price, Heneveld, Cooper, DeWitt & Litton

[57] ABSTRACT

A trailer hitch alignment device includes a pointer assembly for mounting to a rear portion of a vehicle and a target assembly for mounting to the tongue of a trailer in order to align a towing ball on the vehicle with the socket portion of a trailer hitch mounted to the tongue of the trailer. The pointer assembly, including an elongated pointer and mounting means for mounting the pointer to the rear portion of a vehicle, is configured to accommodate virtually all vehicles. The target assembly includes an arcuate surface formed such that all points on the surface, in a predetermined plane, are equidistant from a preestablished center point and further includes indicating means for indicating when the pointer is perpendicular to the adjacent portion of the arcuate surface. When this perpendicular relationship is indicated, the pointer will be traversing the center point, which is mounted directly above the socket assembly, and thus the ball and socket will be aligned.

18 Claims, 4 Drawing Sheets

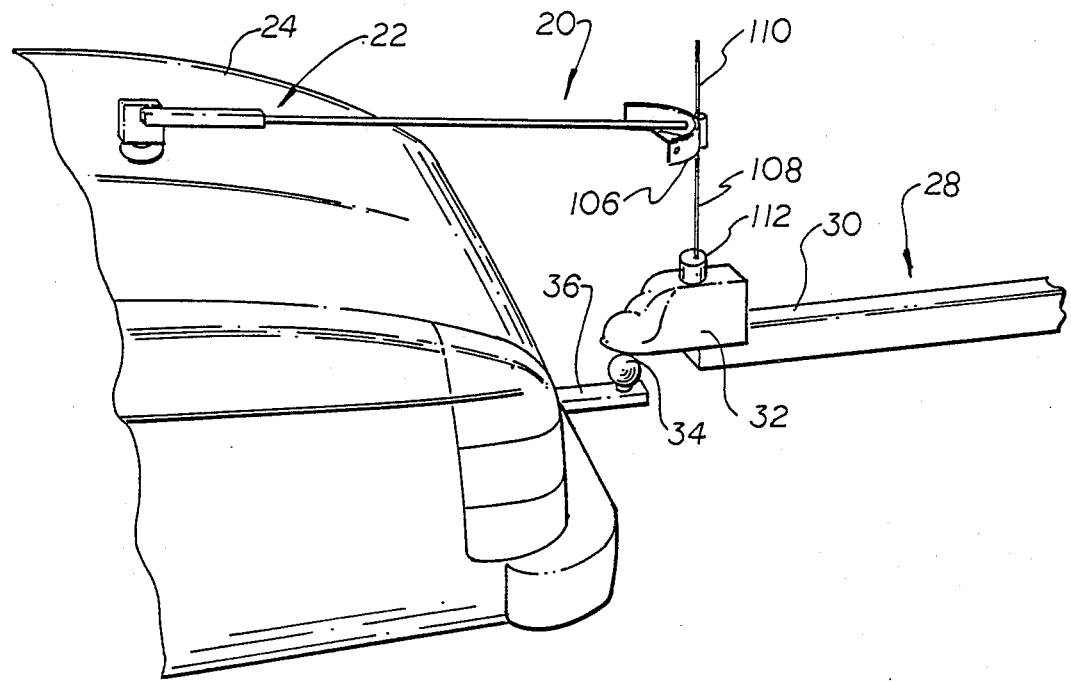
FIG. 1
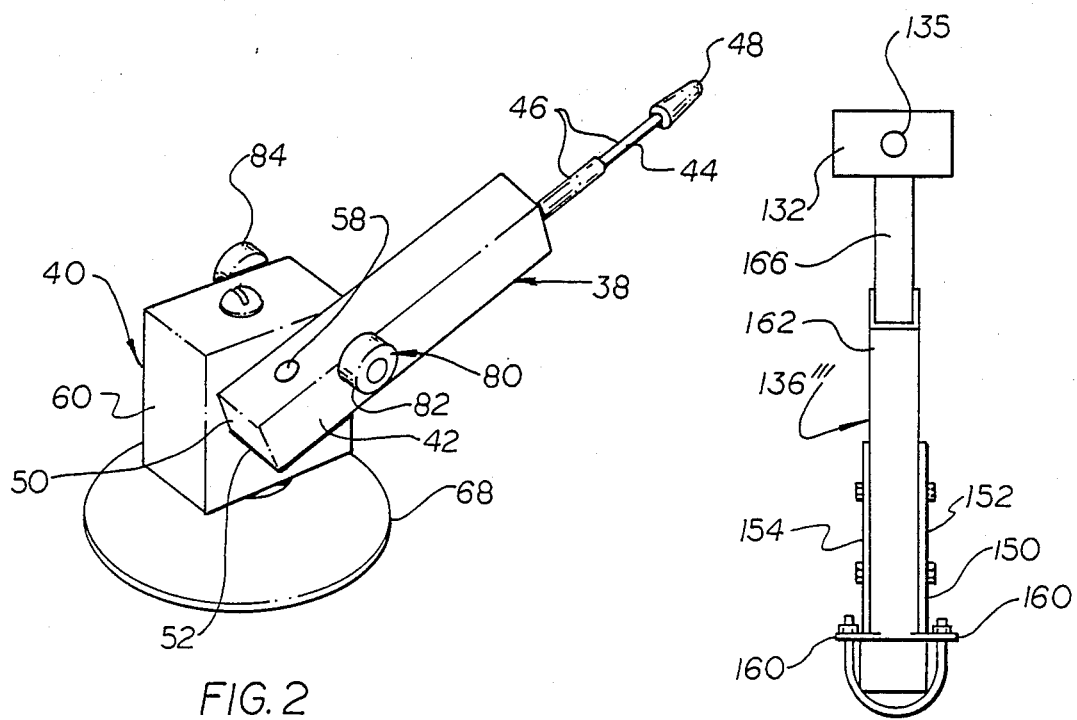
FIG. 2
FIG. 13

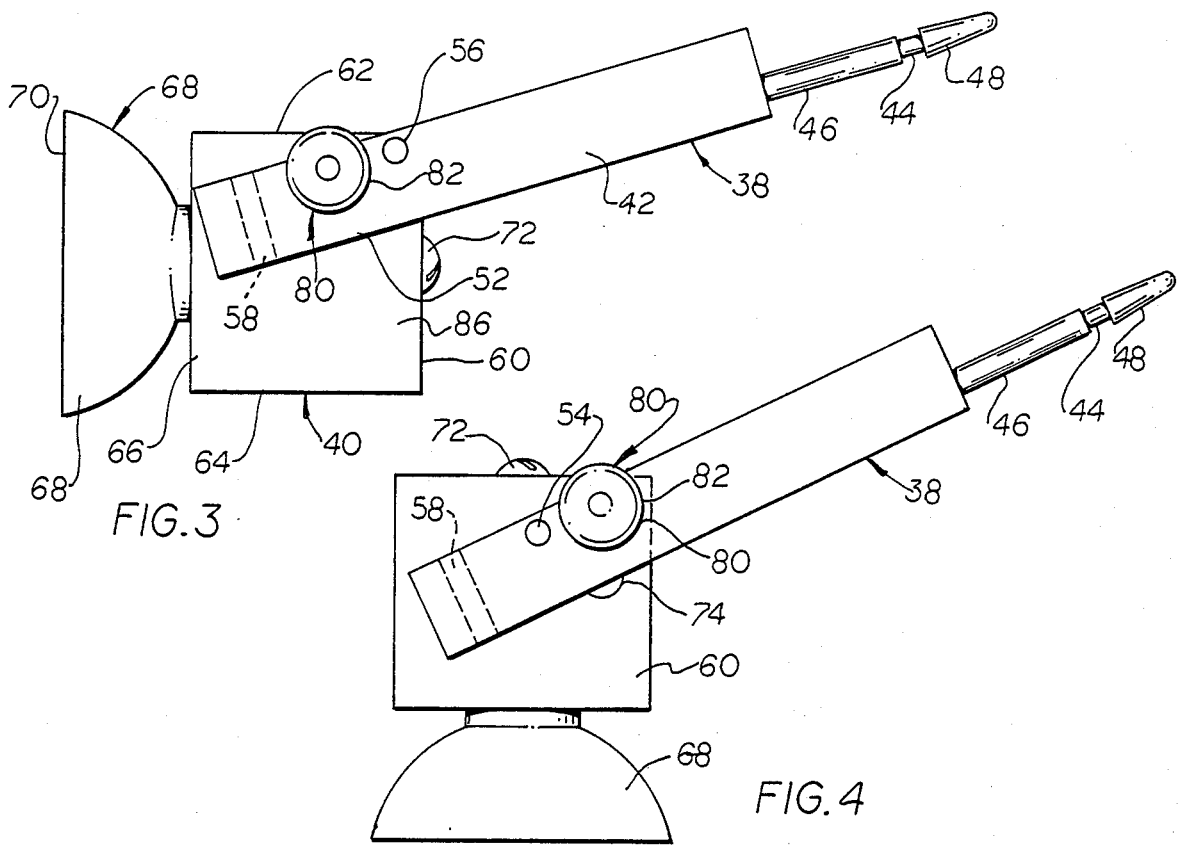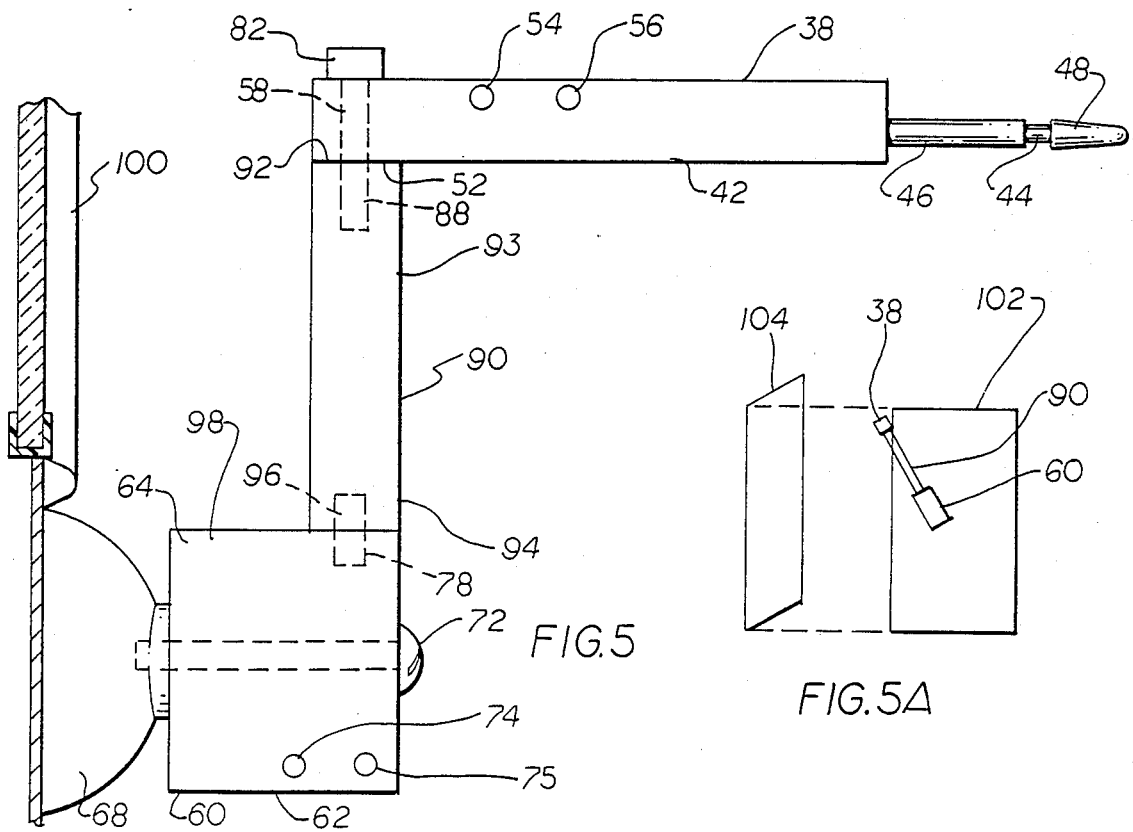

TRAILER HITCH ALIGNMENT DEVICE

BACKGROUND OF THE INVENTION

This invention relates to a device to align a trailer hitch with the towing ball of a vehicle.

In order to attach a trailer to the back of a vehicle to tow the trailer, it is necessary to elevate the tongue of the trailer, to which the socket portion of the hitch is attached, and position the socket over the towing ball, which is attached to the towing vehicle. Because of the weight of most trailers, the most common maneuver is to back the towing vehicle, while observing the position of the towing ball, until the ball is located under the trailer hitch socket. Because the ball is located below the back portion of the vehicle, this maneuver typically requires a second person outside the vehicle to guide the driver of the vehicle.

Many types of alignment devices have been proposed in the prior art to indicate the alignment of the vehicle with the trailer to the driver inside the vehicle. Such prior art devices typically include a target assembly mounted to a forward portion of the trailer tongue or hitch and a pointing assembly mounted on a rear portion of the vehicle, or vice versa, such that bringing a distal portion of the pointing assembly into contact with the target assembly will indicate alignment of the hitch with the ball. The proposed prior art devices, however, have had difficulties that have precluded their acceptance in the marketplace. Most such devices are typically complicated mechanisms which are difficult to install and even more difficult to use. Some of the target assemblies have a large target device that provides good visibility to the driver, but only function properly when the vehicle is backed into a straight-line alignment with the trailer. Other target assemblies accommodate a vehicle backing toward the trailer at an angle to the centerline of the trailer but only at the cost of requiring a very small target which a vehicle driver would have difficulty viewing. Furthermore, the alignment devices of the prior art are usually only suitable for use with a particular type of vehicle or trailer and are not usable with various other types of vehicles.

SUMMARY OF THE INVENTION

The present invention overcomes the difficulties of the prior art alignment devices by providing a pointing assembly that is adaptable to virtually all types of vehicles and a target assembly that is large and visible from the vehicle driver's seat but which accommodates the vehicle approaching the trailer from a large range of angles. A vehicle alignment device according to the invention is simple in construction and easy to mount to the vehicle and trailer.

A trailer hitch alignment device according to the invention includes a pointer assembly having an elongated pointer, mounting means for mounting the pointer to a rear portion of a vehicle and coupling means for adjustably coupling the pointer to the mounting means. In order to accommodate various vehicle types, the mounting means includes a base having a pair of opposing side portions and a third side portion therebetween with attachment means thereon for attaching the base to a vehicle. The pointer includes a neck and an elongated pointing member extending axially outwardly from the neck. The neck may be connected to one of the opposing side portions of the mounting means base directly or through an extension member extending from one of the opposite side portions.

A target assembly according to the invention includes a target device and mounting means for mounting the target device to a trailer. The target device in the preferred embodiment includes an arcuate surface formed such that all points on the surface, in a predetermined plane, are equidistant from a preestablished center point that is remote from the surface. Indicating means are provided to indicate when the pointer is perpendicular with the adjacent portion of the arcuate surface. With the center point positioned above the trailer hitch, the ball will be aligned when the indicating means indicate that the point is perpendicular to the surface regardless of the angle of approach. The indicating means may include providing a reflective finish on the surface so that the pointer will be aligned with its reflected image only when perpendicular to the surface. Alternatively, the indicating means may include an indicator positioned at the center point such that, with the pointer traversing the indicator, it will necessarily be perpendicular to the arcuate surface. The above described indicating means for indicating this perpendicular relationship may be used in combination for a most preferred embodiment of the invention. An alternative embodiment of the target device is provided which has a less complicated construction. Several embodiments of target mounting means are provided to accommodate various trailer configurations.

A trailer hitch alignment device according to the invention is readily adaptable to automobile vehicles having variously-shaped rear portions, pickup trucks, and vans with or without rear windows. The alignment device is easy to install and operate. Superior alignment may be accomplished from a wide range of angles.

These and other related objects, advantages and features of the invention will become apparent upon review of the following specification in conjunction with the drawings.

BRIEF DESCRIPTION OF THE DRAWINGS

FIG. 1 is a perspective view of an alignment device according to the invention as applied to a vehicle and trailer;

FIG. 2 is a perspective view of the pointing assembly shown in FIG. 1;

FIG. 3 is a side view of a pointing assembly configured for mounting to a substantially vertical surface;

FIG. 4 is a side view of a pointing assembly configured for mounting to a substantially horizontal surface;

FIG. 5 is a side view of a pointing assembly configured for, and mounted to, a substantially vertical surface having an irregular shape;

FIG. 5a is a rear view of a van having non-windowed rear doors illustrating a pointing assembly mounted thereto;

FIG. 13 is a front elevational view of the target assembly in FIG. 12.

DESCRIPTION OF THE PREFERRED EMBODIMENT

Figure 9:
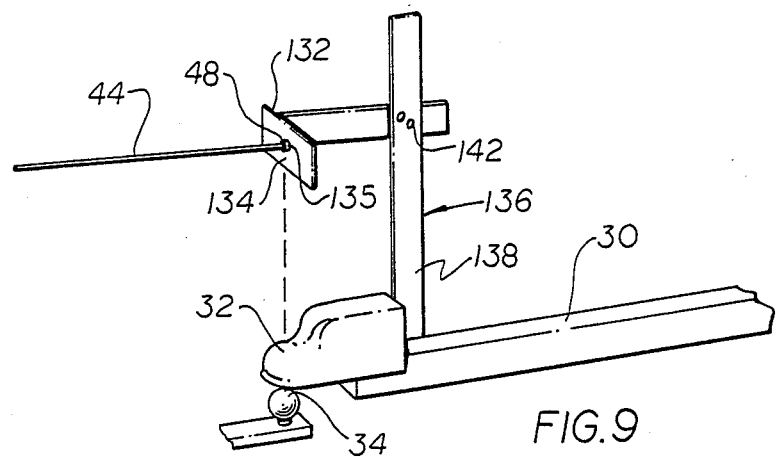
FIG. 9 is a side perspective view of an alternative embodiment target assembly according to the invention.

Referring now specifically to the drawings and the illustrative embodiments depicted therein, a trailer hitch alignment device generally at 20 includes a pointing assembly 22 attached to a rear portion of a prime mover vehicle 24, such as an automobile or the like, and a target assembly 26 attached to a forward portion of a trailer 28. Trailer 28 includes a tongue 30 which terminates forwardly in a trailer hitch socket portion 32. Socket portion 32 is configured for gripping engagement with a towing ball 34 rigidly attached to vehicle 24 by a member 36.

Pointing assembly 22 includes a pointer 38 and mounting means 40 for mounting the pointer to a vehicle surface (FIGS. 2-5). Pointer 38 includes an elongated neck 42 and a pointing member 44 extending outwardly from the neck along a major axis thereof. Pointing member 44 is constructed of a plurality of tubular sections 46 of relatively decreasing diameter away from neck 42 such that the tubular sections 46 nest within each other in one position and are extendable in another position in order to provide length adjustability to pointing member 44. The distal end of pointing member 44 is provided with a pointing tip 48 which, in a preferred embodiment, is coated with a brightly-colored paint such as a bright orange or red to provide enhanced recognition thereof. Neck 42 is generally square when viewed in a cross section perpendicular to its major axis. The squared cross section of neck 42 provides a plurality of engagement surfaces 50 and 52. Neck 42 further includes edge means defining a pair of through-openings 54 and 56 penetrating therethrough perpendicular to its major axis and traversing engagement surface 50. Neck 42 further includes a third through-opening 58 penetrating therethrough perpendicular to its major axis and traversing engagement surface 52.

Mounting means 40 includes a base 60 having first and second opposite side portions 62 and 64 and a third side portion 66 between the oppose side portions. Mounting means 40 further includes attaching means 68 for attaching base 60 to a vehicle surface. Attaching means 68 extends from third side portion 66 and is fastened thereto by a fastener 72 extending through an opening (not shown) in base 60. Attaching means 68 in the illustrative embodiment is a rubber suction cup which attaches base 60 to a surface by providing a vacuum beneath the suction cup but may alternatively be a permanent magnet which attaches base 60 to a metallic vehicle surface such as a trunk lid, tailgate or rear door. Base 60 further includes edge means for defining a pair of through-openings 74 and 76 extending laterally through first side portion 62. Base 60 further includes means for defining a threaded opening 78 in second side portion 64.

Coupling means, generally shown at 80, provide means for coupling pointer 38 to mounting means 40. In the illustrative embodiments, coupling means 80 includes a first portion 82 having a knurled head and an elongated threaded rod extending from the head and of a sufficient length to extend through neck 42 and base 60. Coupling means 80 further includes a second portion 84 such as a knurled nut having an internally threaded surface configured to threadably engage the threaded rod of first portion 82. With coupling means 80 extending through one of openings 54 and 56 and one of openings 74 and 76, engagement surface 50 of neck 42 will be compressed against an engagement surface defined by first side portion 62 of base 60. Alternatively, with first portion 82 of the coupling means extending through opening 58 in neck 42 and threadably engaging a threaded opening 88 in an extension member 90 (FIG. 5) coupling means 80 couples engagement surface 52 with an engagement surface 92 of extension member 90. Extension member 90 is an elongated member having a first end portion defining engagement surface 92 and an opposite end portion 94. A threaded stud 96 extending outwardly from end portion 94 along the axis of elongation of extension member 90 has threads configured to engage threaded opening 78 in order to threadably connect extension member 90 to an engagement surface 98 defined on second side portion 64 of base 60.

The above described structure of pointing assembly 22 facilitates the mounting of the pointing assembly to virtually any consumer vehicle, as will now be explained. The configuration illustrated in FIG. 3 is for mounting to the tailgate of a pickup truck or a substantially vertical surface on an automobile trunk. In this configuration, coupling means 80 extends through opening 54 in neck 42 and opening 74 in base 60. In this manner, neck 42 is substantially flush with the outermost extent of first side portion 62 to provide a pleasing appearancee. The configuration illustrated in FIG. 4 is intended primarily for mounting to substantially horizontal trunk surfaces for automobiles. In this configuration, coupling means 80 extends through opening 56 in neck 42 and opening 76 in base 60. This configuration provides a substantially flush arrangement between neck 42 and the outermost extent of the side portion of base 60 that is opposite attaching means 68.

The configuration illustrated in FIG. 5 is intended for mounting to van doors or the like having substantially vertical surfaces and obstructions such as the frame of a window 100. In the FIG. 5 configuration, extension member 90 is provided between neck 42 and base 60 in order to elevate neck 42 to a position where it may be observed through window 100. Extension member 90 is mounted opposite of attaching means 68 in order to provide clearance for obstructions such as the frame of window 100. FIG. 5a illustrates the use of the pointing assembly in the FIG. 5 configuration on a van having non-windowed rear doors. In the FIG. 5a mounting configuration, mounting means 40 may be attached to a closed van door 102 with extension member 90 angled inwardly and upwardly, with respect to the van and pointer 38 extending rearwardly from the opening normally covered by door 104. With door 104 in the illustrated open position, the vehicle driver can observe pointer 38 through the door opening. In this manner, the alignment device according to the present invention may be used even with vans having non-windowed rear doors. Base 60 and neck 42 are made from any durable plastic such as polypropylene and pointing member 44 is made of steel or aluminum tubular sections.

Figure 6:
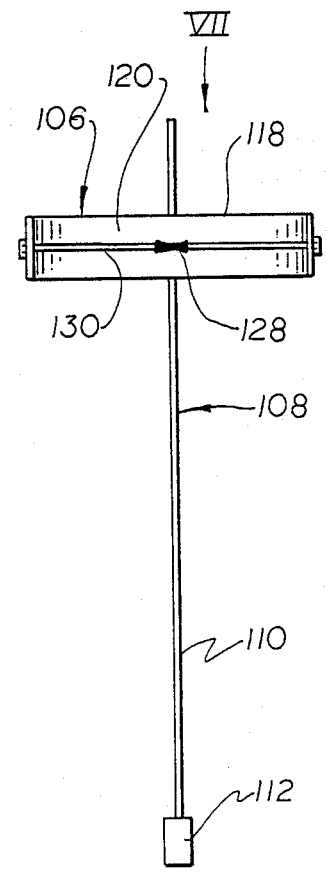
FIG. 6 is a front elevation of a target assembly according to the invention.

Target assembly 26 includes a target device 106 and mounting means 108 for mounting the target device to a trailer tongue 30 (FIGS. 1 and 6). Mounting means 108 includes an elongated support 110 and attaching means 112 which, in the embodiment illustrated in FIGS. 1 and 6, is a permanent magnet configured for attraction to an upper surface of trailer hitch 32. Target device 106 includes a member 118 to which is attached a sleeve 114 having an internal through-opening in which support 110 is received and an adjustment screw 116 capable of retaining target device 106 at a selected position along support 110 (FIG. 7).

Member 118 has a surface 120 which is arcuately formed in a manner that every point on surface 120 that is located on a plane perpendicular to support 110 is equidistant from an imaginary center point 122 which is located forwardly of arcuate surface 120. Target device 106 further includes means for indicating that pointing member 44 is perpendicular to the portion of arcuate surface 120 immediately adjacent tip 48. With target device 106 mounted on tongue 30 such that center point 122 is positioned substantially directly above socket portion 32, the geometric shape of surface 120 provides that, in order for pointing member 44 to be perpendicular to the portion of surface 120 adjacent tip 48, pointer 44 necessarily will traverse center point 122. This is because of the geometric relationship that a line extending from the center of a circle will intersect the circle at a right angle. Because center point 122 is located immediately above socket portion 32, and because the pointing assembly 22 is mounted to vehicle 24 such that pointing member 44 extends above towing ball 34, with the indicating means indicating that pointer 44 is perpendicular to the portion of surface 120 adjacent tip 48 and thus traversing center point 122, socket portion 32 will be vertically above, and thus aligned with, ball 34.

Figure 8:
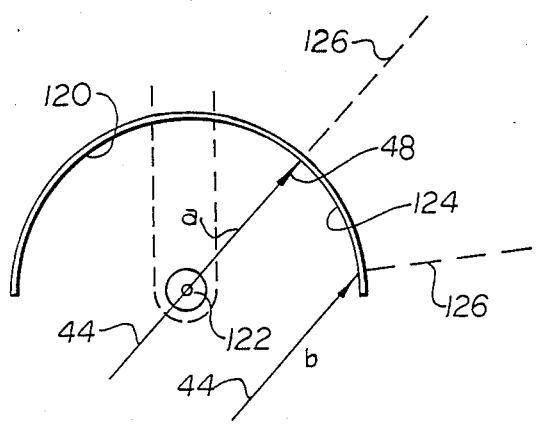
FIG. 8 is the same as FIG. 7 showing an alternative embodiment of the target assembly according to the invention.

In FIG. 8 the illustrated indicating means for indicating that pointing member 44 is perpendicular to the adjacent portion of surface 120 includes providing a reflective finish 124 on surface 120. Use of this embodiment of the indicating means, which includes reflective finish 124, is illustrated in FIG. 8. The image 126 of pointer 44 in the position 'a', which is produced by surface 120, is colinear with pointer 44 when and only when pointer 44 is perpendicular to the portion of surface 120 adjacent tip 48. If pointer 44 instead approaches surface 120 in a manner not perpendicular to the portion adjacent tip 48, as seen at position 'b' in FIG. 8, the image 126 of pointer 44 will extend at an angle to pointer 144. The driver observing image 126 as it relates to pointer 44 will be able to determine when the image is colinear with the pointer and that the pointer 44 is thus perpendicular to the portion of surface 120 immediately adjacent tip 48. The driver will thus be informed that the trailer hitch is in alignment with the towing ball.

Figure 7:
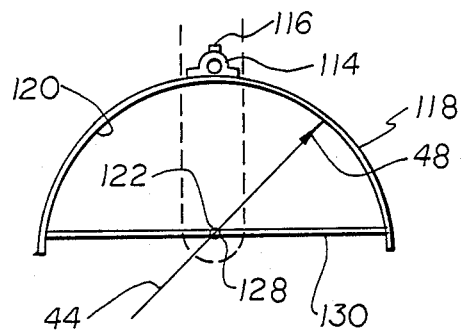
FIG. 7 is a top view taken along the lines VII—VII in FIG. 6.

In FIG. 7 the illustrated indicating means for indicating that the pointing member 44 is perpendicular to the adjacent portion of surface 120 includes a line 130 extending through center point 122 and an indicia 128, such as a colored mark, positioned on line 130 at point 122. The indicating means illustrated in FIG. 7 operates as follows. With the vehicle positioned such that pointing member 44 is traversing indicia 128 and with tip 48 positioned adjacent surface 120, pointer 44 must be perpendicular to the portion of surface 120 adjacent tip 48 because it passes through point 122 which, as previously explained, is at the center of a circle portion defined by surface 120 and must necessarily be perpendicular to the immediately adjacent portion of the circle. The indicating means in FIG. 7 is superior to the prior art devices because, although pointer 44 must be laterally aligned with indicia 128, the forward-to-aft alignment is determined by the position of tip 48 with respect to surface 120 which is much more visible from the interior of the vehicle than the fore-to-aft positioning of tip 48 with an arbitrary point in space as required with prior art devices. Line 130 is narrow and flexible so that if contacted by tip 48, the tip will be deflected either above or below the line.

A most preferred embodiment of the target assembly 26 is provided by combining the indicating means illustrated in both FIGS. 7 and 8. This embodiment thus includes line 130 having indicia 128 thereon in combination with surface 120 being provided with a reflective finish 124. With the combined indicating means, pointer 44 may be guided toward arcuate surface 120 by aiming the pointer at indicia 128. Alignment may then be achieved by observing image 126 converging toward and colinear with the pointer as the pointer tip is brought towards the surface and pointer 44 is kept aligned with indicia 128.

An alternative embodiment of a target device is illustrated at 132 in FIG. 9. Target device 132 has a generally planar surface 134 which is provided with a reflective finish. Target device 132 is attached to tongue 30 by attachment means 136 which includes an upright support 138 and a horizontal support 140 interconnected by fasteners 142. The target device in FIG. 9 operates by producing an image of pointing member 44 on surface 134, which will converge with member 44 as tip 48 approaches surface 134. Thus, with target device 132 immediately above socket 32 and with tip 48 immediately above ball 34, the trailer hitch will be aligned when pointing member 44 converges with its image. An indicia, shown at 135, is provided at the lateral center of surface 134 to provide a target at which to aim tip 48.

Figure 10:
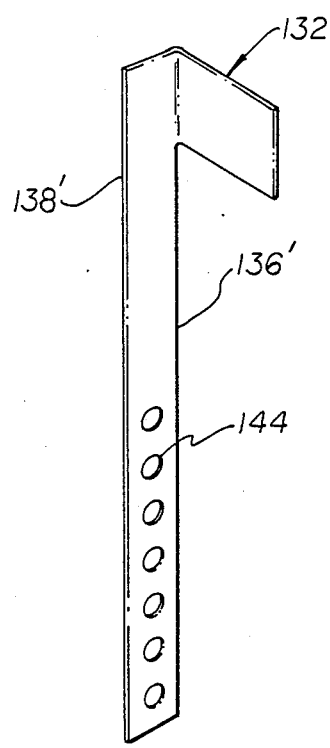
FIG. 10 is an alternative embodiment of a target mounting means.
Figure 11:
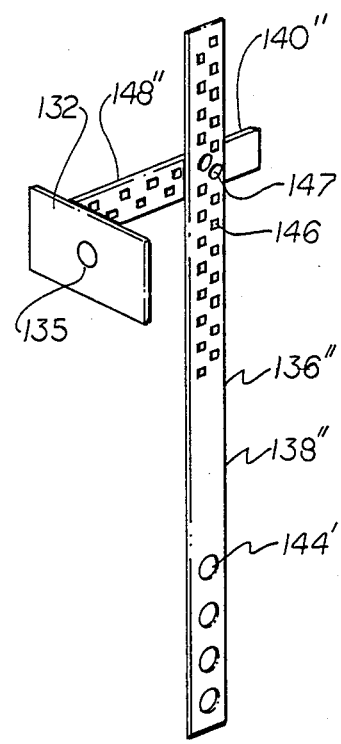
FIG. 11 is an alternative embodiment of a target mounting means.
Figure 12:
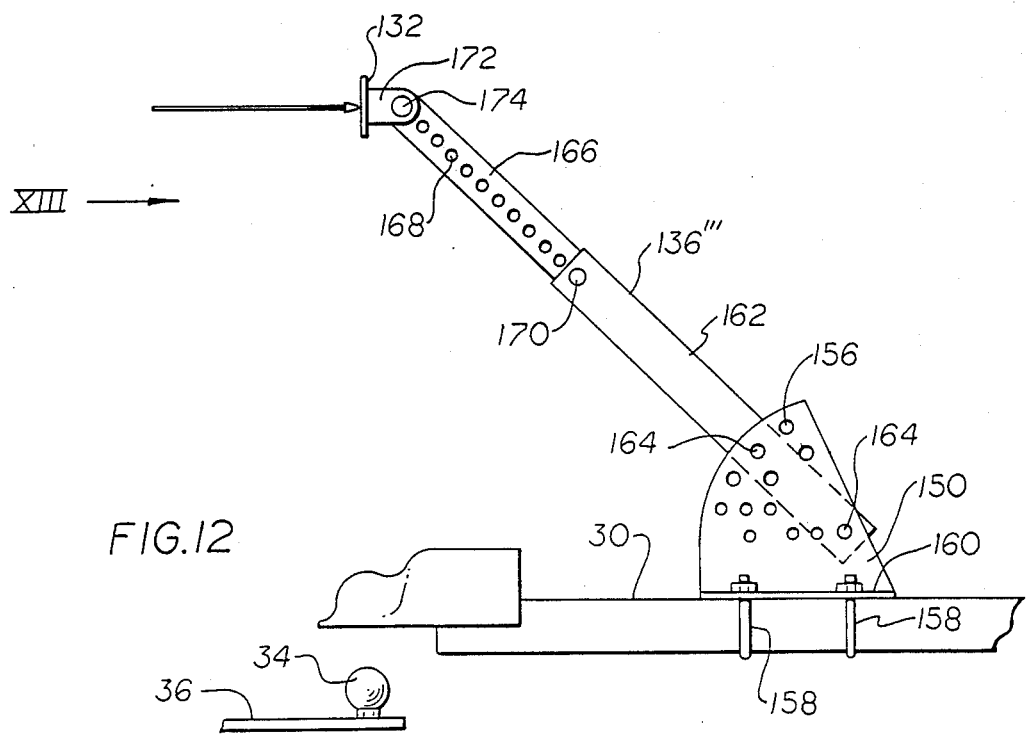
FIG. 12 is yet another alternative embodiment of a target mounting means.

FIGS. 10-12 illustrate alternative attachment means shown used with target device 132. It is to be understood that the mounting means illustrated in FIGS. 10-12 could also be used in combination with target device 106. In FIG. 10 attachment means 136' includes a plurality of apertures 144 spaced along upright support 138', one of which is engaged by a fastener (not shown) passing through an aperture 144 and into tongue 30. By selecting the aperture 144 engaged by the fastener, vertical adjustability of target device 132 with respect to trailer tongue 30 is provided.

In FIG. 11, attachment means 136" includes additional mounting adjustability, which is provided by a multiplicity of apertures 146 at an upward portion of upright support 138" and a multiplicity of corresponding apertures 148 on horizontal support 140" selectively engagable with apertures 146 by fasteners 147. The attachment means 136" in FIG. 11 thus provides additional vertical adjustment plus horizontal adjustment of target device 132.

Attachment means 136''' illustrated in FIGS. 12 and 13 provides a more rugged and permanent mounting for the target device by including a U-shaped base 150 having spaced-apart walls 152 and 154 perforated by a plurality of aligned openings 156. Base 150 may be attached to a tongue 30 by a plurality of U-bolts 158 extending around tongue 30 and engaging flanges 160 extending laterally outwardly from walls 152 and 154. Attachment means 136''' further includes a lower support member 162 formed as an elongated box-beam which is attached to base 150 by a plurality of fasteners 164 extending through walls 152, 154 and support 162. Telescopingly received within support 162 is an upper support 166 which includes a plurality of openings 168 along its length. A fastener 170 extending laterally through an upper portion of lower support 162 and through an opening 168 in upper support 166 retains upper support 166 rigid with respect to lower support 162. A bracket 172 extending rearwardly from target device 132 is fastened to upper support 166 by a fastener 174. The attachment means in FIGS. 12 and 13 is capable of positioning target device 132 above ball 34 by positioning fasteners 164 in the desired openings 156 and by positioning fastener 170 within the desired opening 168 in member 166. Target device 132 is then aligned vertically and fastener 174 tightened. Substantially all of the components of the target assemblies in FIGS. 6-13 are made from steel or aluminum.

The alignment device according to the invention is readily assembled to a vehicle and trailer by first aligning the trailer hitch socket portion 32 with towing ball 34. The pointer assembly 22 is mounted to a suitable surface on the rear portion of vehicle 24 and coupling means 80 is loosened in order to position pointer 38 substantially horizontally. Coupling means 80 is then tightened to retain pointer 38 in that position. If target 106 is to be used, it is mounted at the same vertical height as pointer 38 and with center point 122 immediately above ball 34 and surface 120 facing forwardly. Pointing member 44 is extended such that tip 48 is immediately adjacent surface 120. If the target device 132 is to be used, surface 134 is positioned immediately above ball 34 and pointing member 44 is extended such that tip 48 is immediately adjacent surface 134. Small dots of touch-up paint may then be applied on the vehicle and on the various portions of the alignment device so that the components thereof may be subsequently removed and repositioned in the precise configuration to which they are initially aligned.

Changes and modifications in the specifically described embodiments can be carried out without departing from the principles of the invention which is intended to be limited only by the scope of the appended claims, as interpreted according to the principles of patent law including the Doctrine of Equivalents.

The embodiments of the invention in which an exclusive property or privilege is claimed are defined as follows:

1. A trailer hitch alignment device comprising:
   a pointing assembly having an elongated pointer, mounting means for mounting said pointer to a rear portion of a vehicle and adjustable coupling means for adjustably coupling said pointer to said mounting means;
   said mounting means including a base and attaching means for attaching said base to a surface of a vehicle, said base including first and second opposite side portions, a third side portion between said opposite side portions, a first engagement surface adjacent said first side portion and a second engagement surface on one of said first and second side portions, said attaching means positioned on said third side portion;
   said pointer including a neck and an elongated pointing member attached to said neck and extending outwardly along an axis of said neck, said neck including a third engagement surface laterally of said axis;
   an elongated extension member having a fourth engagement surface and means opposite said fourth engagement surface for mounting said extension member to said second engagement surface whereby said pointer is capable of being selectively coupled to said mounting means in a first manner in which said third engagement surface engages said first engagement surface and in a second manner in which said neck is fastened with fastening means to said fourth engagement surface; and
   a target assembly having a target device configured to be aligned with said pointing member and trailer mounting means for mounting said target device to a trailer.

2. A trailer hitch alignment device comprising:
   a pointing assembly having an elongated pointer, mounting means for mounting said pointer to a rear portion of a vehicle and adjustable coupling means for adjustably coupling said pointer to said mounting means;
   said mounting means including a base and attaching means for attaching said base to a surface of a vehicle, said base including first and second opposite side portions, a third side portion between said opposite side portions, a first engagement surface adjacent said first side portion and a second engagement surface on one of said first and second side portions, said attaching means positioned on said third side portion;
   said pointer including a neck and an elongated pointing member attached to said neck and extending outwardly along an axis of said neck, said pointing member comprising a plurality of coaxially arranged tubular sections configured to be selectively telescoped together or extended outwardly with respect to each other, said neck including a third engagement surface laterally of said axis, whereby said pointer is capable of being selectively coupled to said mounting means in one manner in which said third engagement surface engages said first engagement surface and in a second manner in which said neck is fastened with fastening means to a fourth engagement surface on an extension member extending from said second engagement surface; and
   a target assembly having a target device configured to be aligned with said pointing member and trailer mounting means for mounting said target device to a trailer.

3. A trailer hitch alignment device comprising:
   a pointing assembly having an elongated pointer, mounting means for mounting said pointer to a rear portion of a vehicle and adjustable coupling means for adjustably coupling said pointer to said mounting means;
   said mounting means including a base and attaching means for attaching said base to a surface of a vehicle, said attaching means comprising a suction cup, said base including first and second opposite side portions, a third side portion between said opposite side portions, a first engagement surface adjacent said first side portion and a second engagement surface on one of said first and second side portions, said attaching means positioned on said third side portion;
   said pointer including a neck and an elongated pointing member attached to said neck and extending outwardly along an axis of said neck, said neck including a third engagement surface laterally of said axis, whereby said pointer is capable of being selectively coupled to said mounting means in one manner in which said third engagement surface engages said first engagement surface and in a second manner in which said neck is fastened with fastening means to a fourth engagement surface on an extension member extending from said second engagement surface; and a target assembly having a target device configured to be aligned with said pointing member and trailer mounting means for mounting said target device to a trailer.

4. A trailer hitch alignment device comprising:

a pointing assembly having an elongated pointer, mounting means for mounting said pointer to a rear portion of a vehicle and adjustable coupling means for adjustably coupling said pointer to said mounting means;

said mounting means including a base and attaching means for attaching said base to a surface of a vehicle, said base including first and second opposite side portions, a third side portion between said opposite side portions, a first engagement surface adjacent said first side portion and a second engagement surface on one of said first and second side portions, said attaching means positioned on said third side portion;

said pointer including a neck and an elongated pointing member attached to said neck and extending outwardly along an axis of said neck, said neck including a third engagement surface laterally of said axis, whereby said pointer is capable of being selectively coupled to said mounting means in one manner i which said third engagement surface engages said first engagement surface and in a second manner in which said neck is fastened with fastening means to a fourth engagement surface on an extension member extending from said second engagement surface;

said coupling means comprising means for compressing the respective said engagement surfaces together; and a target assembly having a target device configured to be aligned with said pointing member and trailer mounting means for mounting said target device to a trailer.

5. A trailer hitch alignment device comprising:

a pointing assembly having an elongated pointer, mounting means for mounting said pointer to a rear portion of a vehicle and adjustable coupling means for adjustably coupling said pointer to said mounting means;

said mounting means including a base and attaching means for attaching said base to a surface of a vehicle, said base including first and second opposite side portions, a third side portion between said opposite side portions, a first engagement surface adjacent said first side portion and a second engagement surface on one of said first and second side portions, said attaching means positioned on said third side portion;

said pointer including a neck and an elongated pointing member attached to said neck and extending outwardly along an axis of said neck, said neck including a third engagement surface laterally of said axis, whereby said pointer is capable of being selectively coupled to said mounting means in one manner in which said third engagement surface engages said first engagement surface and in a second manner in which said neck is fastened with fastening means to a fourth engagement surface on an extension member extending from said second engagement surface;

a target assembly having a target device configured to be aligned with said pointing member ad trailer mounting means for mounting said target device to a trailer, said target device including an arcuate surface wherein all points on said surface in a predetermined plane are equidistant from a predetermined center point that is not on said surface and indicating means for indicating when said pointer is perpendicular to the portion of said surface adjacent said pointer.

6. The alignment device in claim 5 in which said indicating means includes means for indicating the location of said center point.

7. The alignment device in claim 5 in which said means for indicating the location of said center point comprises a line intersecting said center point and indicia on said line of said center point.

8. The alignment device in claim 5 in which said indicating means includes said surface being reflective so that the reflected image of the pointer may be determined to be aligned with the pointer.

9. The alignment device in claim 8 in which said indicating means includes said surface being reflective so that the reflected image of the pointer may be determined to be aligned with the pointer.

10. A trailer hitch alignment device comprising:

a pointing assembly having an elongated pointer and mounting means for mounting said pointer to a rear portion of a vehicle;

a target assembly having a target device and mounting means for mounting said target device to a trailer;

said target device including an arcuate surface wherein all points on said surface in a predetermined plane are equidistant from a predetermined center point that is not on said surface, said arcuate surface facing in the direction to which said trailer is to be aligned; and indicating means for indicating when said pointer is perpendicular to the portion of said surface adjacent said pointer.

11. The alignment device in claim 10 in which said indicating means includes means for indicating the location of said center point.

12. The alignment device in claim 11 in which said means for indicating the location of said center point comprises a line intersecting said point and indicia on said line at said center point.

13. The alignment device in claim 12 in which said indicating means includes said surface being reflective.

14. The alignment device in claim 10 in which said indicating means includes said surface being reflective.

15. The alignment device in claim 10 in which said mounting means includes an upright support member and means for selectively vertically positioning said upright support member on a trailer.

16. The alignment device in claim 15 in which said mounting means further includes a horizontal support member and means for selectively horizontally positioning said horizontal support member on said upright support member.

17. The alignment device in claim 16 in which said mounting means further includes means for selectively vertically positioning said horizontal support member on said upright support member.

18. The alignment device in claim 10 in which said mounting means includes a mounting base, means for attaching said mounting base to a trailer, a lower support member, means for pivotally mounting said lower support member to said mounting base, an upper support member aligned with said lower support member, means for adjustably mounting said upper support member to said lower support member and means for attaching said target device to said upper support member.

* * * * *

UNITED STATES PATENT AND TRADEMARK OFFICE
CERTIFICATE OF CORRECTION

PATENT NO. : 4,856,200

DATED : August 15, 1989

INVENTOR(S) : Eugene W. Riggs

It is certified that error appears in the above-identified patent and that said Letters Patent is hereby corrected as shown below:

Column 9, Claim 4, Line 32:

"i" should be --in--;

Column 10, Claim 5, Line 5:

"ad" should be --and--.

Signed and Sealed this

Twentieth Day of November, 1990

Attest:

HARRY F. MANBECK, JR.

*Attesting Officer*       *Commissioner of Patents and Trademarks*